United States Patent [19]

Hope

[11] 4,398,430
[45] Aug. 16, 1983

[54] RUDDER PEDAL GRIP ASSEMBLY

[75] Inventor: Dana R. Hope, Dayton, Ohio

[73] Assignee: The United States of America as represented by the Secretary of the Air Force, Wasington, D.C.

[21] Appl. No.: 235,488

[22] Filed: Feb. 18, 1981

[51] Int. Cl.³ .............................................. G01F 5/22
[52] U.S. Cl. .................................. 73/862.54; 73/132
[58] Field of Search ............... 73/132, 862.38, 862.53, 73/862.54, 862.58; 244/234-236

[56] References Cited

U.S. PATENT DOCUMENTS

| | | | |
|---|---|---|---|
| 1,684,639 | 9/1928 | Sanford | 73/132 |
| 1,884,701 | 10/1932 | Howard . | |
| 2,358,369 | 9/1944 | Weaver et al. . | |
| 2,663,187 | 12/1953 | Wood, Jr. et al. | 73/862.58 X |
| 2,670,574 | 3/1954 | Schuster . | |
| 3,602,043 | 8/1971 | Markey | 73/132 |
| 3,613,440 | 10/1971 | Tinkham | 73/132 |
| 3,788,131 | 1/1974 | Markey | 73/132 |

FOREIGN PATENT DOCUMENTS 1001879  2/1952  France .............................. 73/862.58
907223 10/1962  United Kingdom .................. 73/132

*Primary Examiner*—Charles A. Ruehl
*Attorney, Agent, or Firm*—Donald J. Singer; Frank J. Lamattina

[57] ABSTRACT

A universally fitting and reusable grip assembly for non-destructive and removable attachment to a pedal, such as a rudder pedal of an aircraft or flight simulator. The grip assembly includes two hingedly connected clamps whose frame members are fitted, respectively, over the top edge and under the bottom edge of the pedal, with clamp screws threadedly adjusted to secure the clamp frames to the pedal; and, an artificial pedal member which incorporates a load cell and which is attached to the lower disposed one of the two clamp frame members. The load cell measures the force applied to the pedal, such as by a pilot's foot or other sources, including a remotely located, interconnected, conventional load applying device. If the grip assembly is used on a rudder pedal of an aircraft or flight simulator, the grip assembly need not be removed in order to fly the aircraft (or flight simulator) in the conventional manner.

5 Claims, 6 Drawing Figures

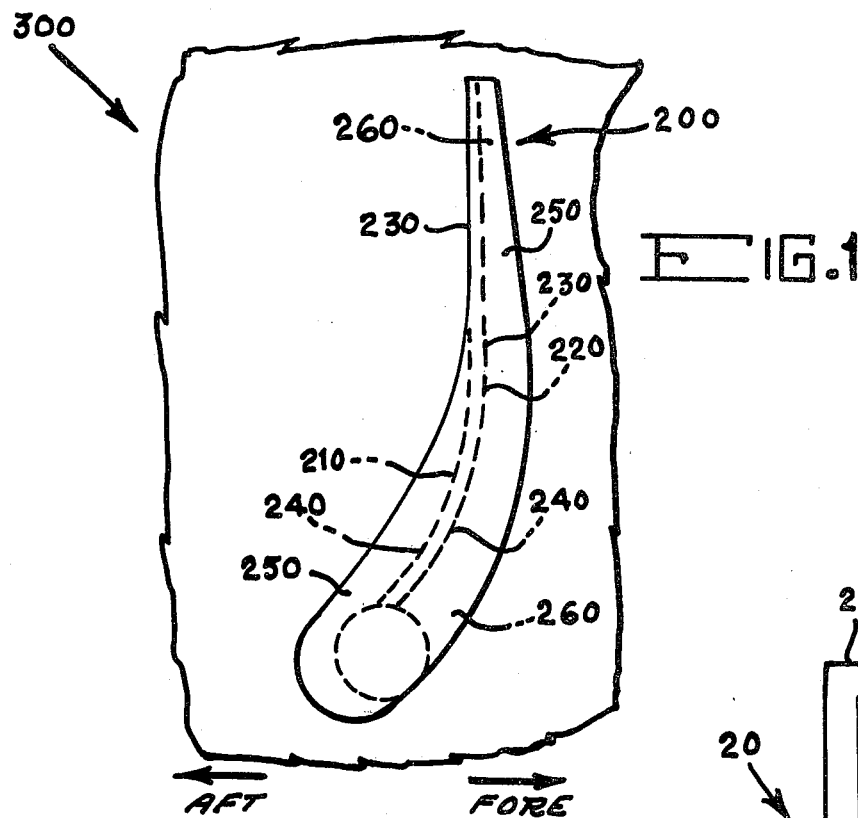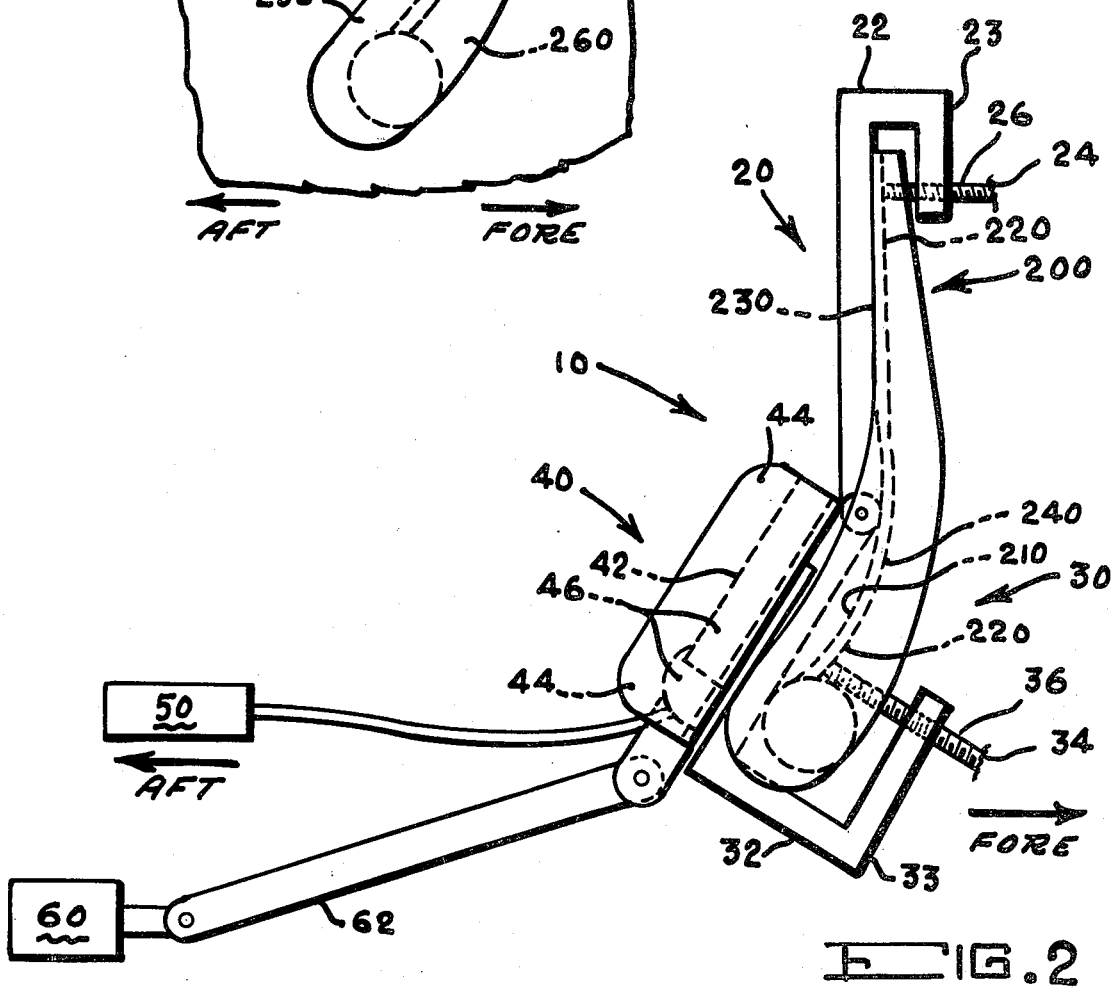

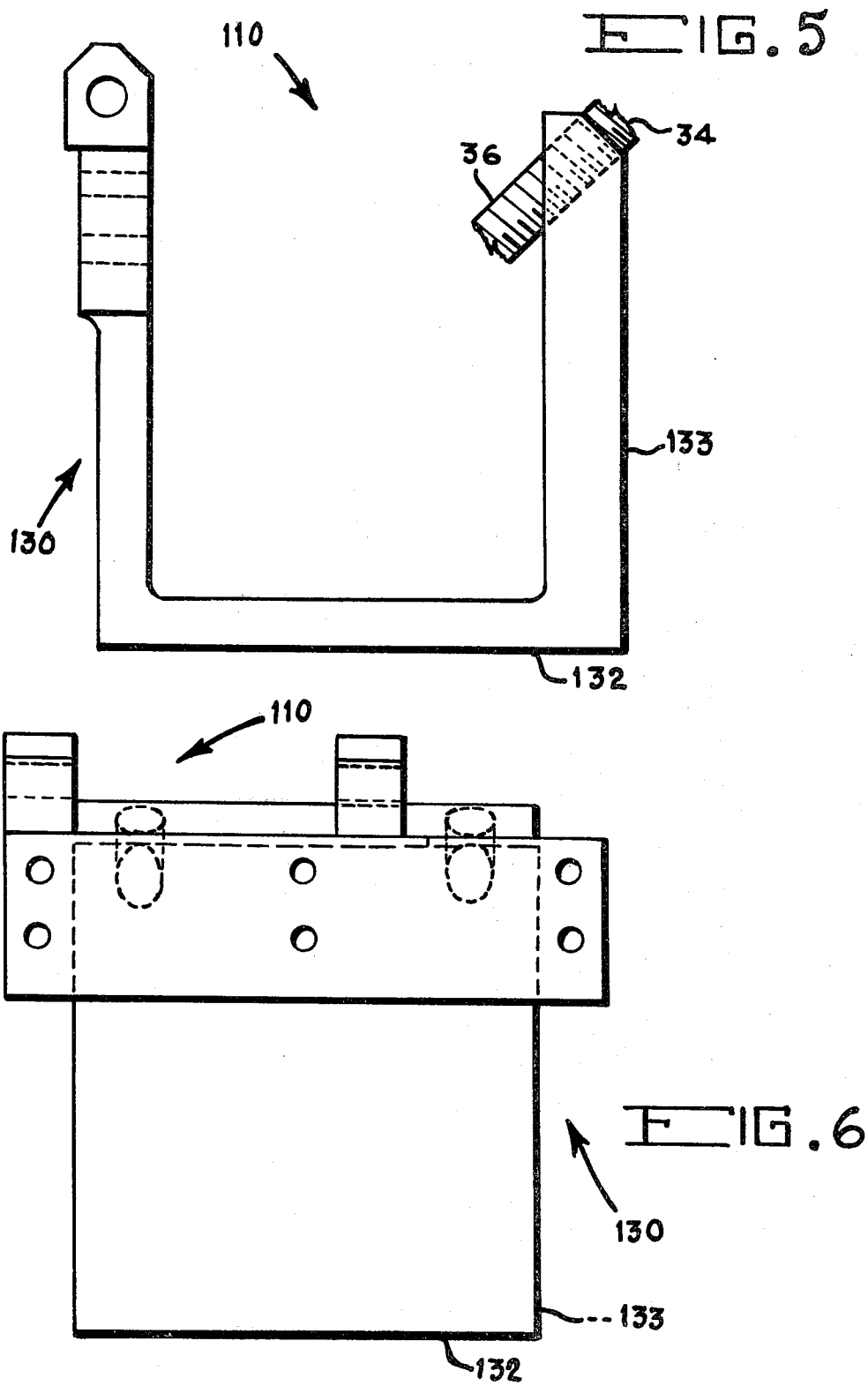

4,398,430

RUDDER PEDAL GRIP ASSEMBLY

STATEMENT OF GOVERNMENT INTEREST

The invention described herein may be manufactured and used by or for the Government for governmental purposes without the payment of any royalty thereon.

BACKGROUND OF THE INVENTION

This invention relates generally to pedal grips and, more particularly, to a unique grip assembly for a rudder pedal, such as a rudder pedal of an aircraft or of an aircraft flight simulator.

In testing the flight control systems of aircraft, and of aircraft flight simulators (hereinafter referred to as "flight simulators"), the testing of the rudder control system must be included.

Since the rudder control system is actuated by either one of the two rudder pedals, as appropriate, each pedal must be tested by the application of a load (i.e., a force or pressure) to determine if the rudder is being actuated, the amount of load which will cause actuation, the measurement of resultant pedal displacement, and the spring, dampening, and inertial characteristics of the rudder control and the control loading system. Presently the conventional testing of the rudder control system includes purchasing, or making, a custom designed grip for the rudder pedal of that particular aircraft or flight simulator, because a rudder pedal grip is essential for performing the aforementioned tests.

As may be obvious from the foregoing, the custom-designed pedal grip fits only that particular aircraft and/or flight simulator, and cannot be used with other aircraft and flight simulators. What may not be obvious to the uninitiated is that these custom-designed rudder pedal grips are costly to buy or make, are often clumsy to attach and/or use, are many times damaging to or destructive of the rudder pedal being tested, and are frequently damaged or destroyed in use so that prior art pedal grips cannot be considered reusable, even on the same aircraft or flight simulator.

It is readily apparent that what is needed in the art and is not presently available, is a rudder pedal grip that is non-destructive to the rudder pedal, that is reusable, and that is universally fitting, i.e., readily useable or adaptable for use on any rudder pedal of any aircraft or flight simulator.

SUMMARY OF THE INVENTION

The instant invention fulfills the above-mentioned need; and also, unlike prior art rudder pedal grips, makes possible in application of a load (i.e., force or pressure) to the rudder pedal not only through the use of the pilot's foot, but also through the use of any appropriate load applier. Therefore, this unique rudder pedal grip constitutes a significant advance in the state-of-the-art.

Accordingly, it is the principal object of this invention to provide a uniquely structure pedal grip that may be fitted on and secured to a pedal, including a rudder pedal.

It is another object of this invention to provide a pedal grip that is so structured that it will fit any pedal, i.e., is universally fitting.

It is still another object of this invention to provide a pedal grip that is non-destructive to the pedal to which the grip is attached.

It is yet another object of this invention to provide a pedal grip that is non-destructive to itself, i.e., is reusable.

It is a further object of this invention to provide a rudder pedal grip which is movable not only by the application of a load through a pilot's foot, but also by the application of any other load applier, including a remotely located load which is linked to the rudder pedal grip.

It is a still further object of this invention to provide a rudder pedal grip which need not be removed to fly the aircraft or flight simulator conventionally.

It is a yet still further object of this invention to provide a pedal grip that is easy to attach, that is not clumsy to handle or use, that is quickly attachable and removable, and that is easy and inexpensive to make.

These objects of this invention, as well as other objects related thereto, will become readily apparent after a consideration of the description of the invention, together with reference to the contents of the Figures of the drawing.

DESCRIPTION OF THE DRAWING

FIG. 1 is a side elevation view, in simplified pictorial and schematic form, of a representative pedal useable with the instant invention;

FIG. 2 is a side elevation view, in simplified pictorial and schematic form, of an embodiment of the instant invention in use with the representative pedal shown in FIG. 1; and FIGS. 3-6, inclusive, are various views, in simplified pictorial and schematic form, of two major components of another embodiment of the instant invention.

DETAILED DESCRIPTION OF THE EMBODIMENTS

Figure 3:
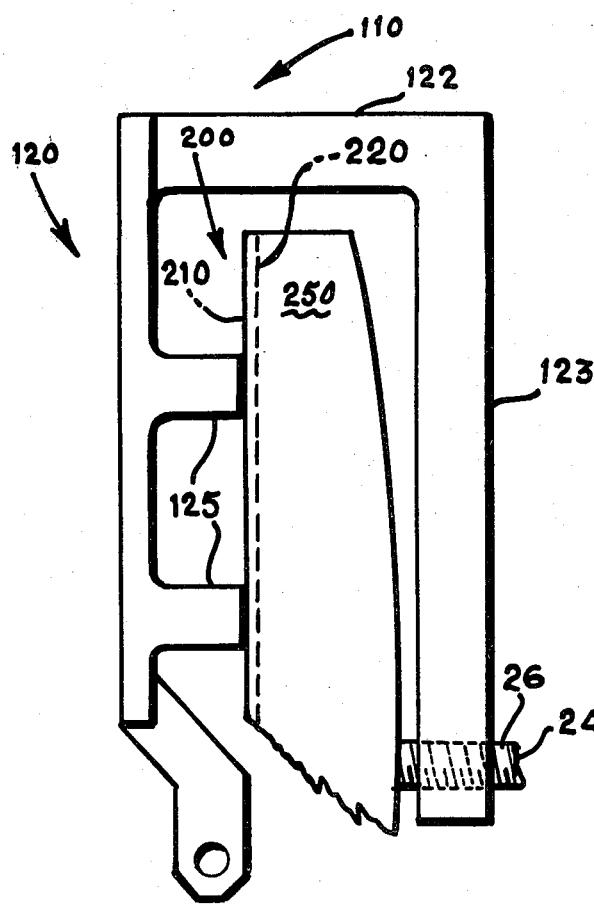

As a preliminary matter, it is to be remembered that the instant invention is a universal (i.e., universally fitting), reusable, grip for non-destructive and removable attachment to a pedal, including but not limited to a rudder pedal of an aircraft or flight simulator.

With reference to FIG. 1, therein is shown a representative pedal 200 which, for illustrative purposes, is assumed to be a conventional rudder pedal (of the two similar rudder pedals) of a typical aircraft or flight simulator, such as is shown in fragmented form and is generally designated 300. Also shown in FIG. 1 are the directional designations "Fore" and "Aft" to better orient the reader.

The pedal 200 has a front surface 210, a rear surface 220, an upper portion 230, a lower portion 240, and sidewalls 250 and 260.

With reference to FIG. 2, therein is shown the pedal 200 to which has been removably attached an embodiment 10 of the instant invention. In the most basic and generic structural form, the inventive pedal grip or, more accurately, the inventive pedal grip assembly 10 comprises: a first clamp means 20 that is removably attached to the upper portion 230 of the pedal 200; a second clamp means 30 that is removably attached to the lower portion 240 of the pedal 200, and that is connected (preferably hingedly) to the first clamp means 20; and, means 40 (that is operatively associated with the first and second clamp means 20 and 30 and that is attached to the front surface of the second clamp means 30) for measuring the amount of a load (i.e., a force or a pressure) that is applied to the first and second clamp means 20 and 30 and thereby to the pedal 200, and for measuring any displacement of the pedal that results from the application of the load.

More specifically, the first clamp means 20 includes a first frame member 22, and a first movable securing means 24 that is operably associated with the first frame member 22. Similarly, the second clamp means 30 includes a second frame member 32, and a second movable securing means 34 that is operably associated with the second frame member 32. Additionally, the first movable securing means 24 includes at least one clamp screw member 26 which is threadedly movable (preferably by hand, with the use of a knob which is not shown) in the first frame member 22; and, the second movable securing means 34 includes at least one (and, preferably, two) clamp screw members 36 which are threadedly movable (also preferably by hand, with the use of a knob on each which is not shown) in the second frame member 32.

Further, the applied load and pedal displacement measuring means 40, FIG. 2, includes: an artificial pedal member 42 which is attached to the front surface of the second frame member 32; and, a transducer means 46 (i.e., a load cell, such as is commercially available from the Lebow Products Electronic Instruments Division of the Eaton Corp., 1728 Maplelane Rd., P.O. Box 1086, Troy, Mich. 48099) which is attached to the artificial pedal member 42, with the transducer, means 46 operably connected to a conventional load and pedal displacement measuring device 50. It is to be noted that the artificial pedal member 42 preferably has, but need not have, sidewalls 44.

As is shown in FIG. 2, the first frame member 22 overhangs the upper portion 230 of the pedal 200; the first clamp screw member 26 is in securing contact with the rear surface 220 of the pedal 200; the second frame member 32 is disposed in an underslung position relative to the lower portion 240 of the pedal 200; the second clamp screw member (or members) 36 is (are) in securing contact with the rear surface 220 of the pedal 200; and, the artificial pedal member 42 is disposed over the lower portion 240 of the pedal 200 and above the front surface 210 of the pedal 200.

With reference to FIGS. 3–6, inclusive, therein are shown the two major components 120 and 130 of another embodiment 110 of the inventive pedal grip assembly.

Figure 4:
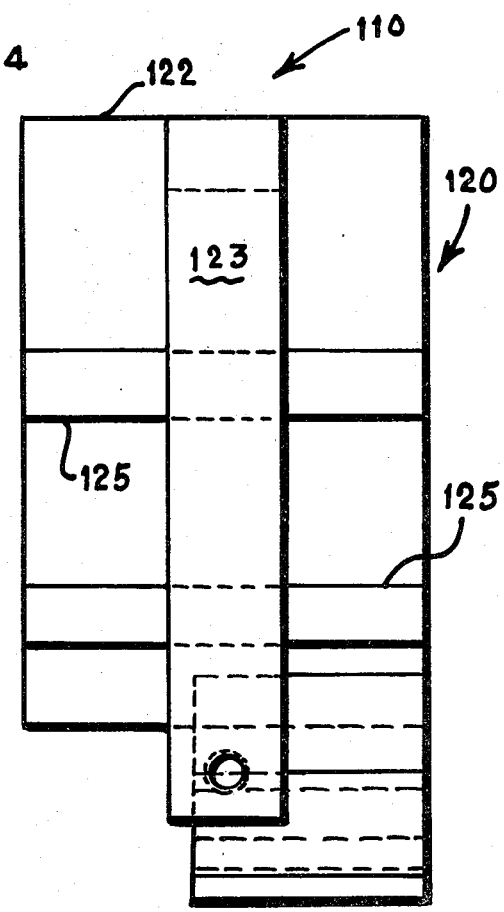

In FIGS. 3 and 4 is shown, in a side elevation view and in a back view respectively, the first clamp means 120 of this second embodiment 110. This clamp means 120 is similar to clamp means 20, FIG. 2, of the other embodiment 10, FIG. 2. The fundamental structural differences are: that the overhang portion 123 of the frame member 122 is longer than the corresponding overhang portion 23 of the frame member 22, FIG. 2; and, that the frame member 122 has at least one protrusion 125 (and, preferably, two as shown) extending therefrom and in contact with the front surface 210 of the pedal 200, as is shown in FIG. 3.

In FIGS. 5 and 6 is shown, in a side elevation view and in a rear view respectively, the second clamp means 130 of this second embodiment 110. This clamp means 130 is similar to clamp means 30, FIG. 2, of the other embodiment 10, FIG. 2. The fundamental structural difference is that the underslung portion 133 of the frame member 132 is longer than the corresponding underslung portion 33 of the frame member 32, FIG. 2.

Again with reference to FIG. 2, the artificial pedal member 42 may be releasably linked to a remotely located load 60, such as a conventional driving device, to make precise inputs to the pedal 200. The linkage may be accomplished by any conventional means, such as interconnecting arm 62. The remotely located load 60 can be applied selectively, by any one of many conventional means, to the pedal 200.

MANNER OF USE OF THE EMBODIMENTS

The manner of use of either embodiment 10, FIG. 2, and 110, FIGS. 3–6, can be easily ascertained by any person of ordinary skill in the art from the foregoing description, coupled with reference to the Figures of the drawing, particularly FIG. 2.

Essentially, the first clamp means 20 (or 120) is fitted over the top portion 230 of the pedal 200; and, the second clamp means 30 (or 130), with the artificial pedal member 42 and the transducer means 46 attached thereto, is fitted over the lower portion 240 of the pedal 200. The embodiment 10 or 110, as a whole, is positioned to make the necessary contact with the pedal 200, and the clamp screw members 26 and 36 are threadedly adjusted until they contact the back surface 220 of the pedal 200 and secure the embodiment 10 or 110 to the pedal 200. The pedal grip assembly 10 or 110 is now useable for direct application of a load, such as by pilot's foot. If, however, the pedal grip assembly 10 or 110 is to be used for the "indirect" application of a load, then the interconnecting arm 62 is connected at one end to the artificial pedal member 42 and at the other end to the remote load-applying device 60 and that device is activated.

It is here to be noted that, if the pedal grip assembly 10 or 110 is attached to the rudder pedal of an aircraft (or flight simulator) for the application of direct load (i.e., a pilot's foot), the pedal grip assembly need not be removed to fly the aircraft (or flight simulator) in the conventional manner.

CONCLUSION

It is abundantly clear from all of the foregoing, and from the contents of the Figures of the drawing, that the stated object of this invention, as well as other objects related thereto, have been achieved.

It is to be noted that, although there have been described and shown the fundamental and unique features of the invention, as applied to two embodiments, various other embodiments, variations, adaptations, substitutions, additions, omissions, and the like may occur to, and can be made by, those of ordinary skill in the art.

What is claimed is:

1. A universal, reusable, grip assembly for non-destructive and removable attachment to a pedal, comprising:
   a. a first clamp means for being removably attached to an upper portion of said pedal, wherein said means includes:
      a first frame member which overhangs said upper portion of said pedal; and
      a first movable means for securing said first frame to said pedal, wherein this means includes a first clamp screw member threadedly movable in said first frame member and also in securing contact with a rear surface of said pedal, with said first movable securing means operably associated with said first frame member;
   b. a second clamp means for being removably attached to a lower portion of said pedal, wherein this means includes:

a second frame member hingedly connected to said first frame member and disposed in an underslung position relative to said lower portion of said pedal; and a second movable means for securing said second frame member to said pedal, wherein this means includes a second clamp screw member threadedly movable in said second frame member and also in securing contact with a rear surface of said pedal, with said second movable securing means operably associated with said second frame member; and c. means, operably associated with said first and said second clamp means and attached to a front surface of said second clamp means for measuring the amount of a load applied to said first and said second clamp means and to said pedal, and for measuring any resultant displacement of said pedal, wherein said applied load and pedal displacement measuring means includes:

an artificial pedal member attached to a front surface of said second frame member; and a transducer means attached to said artificial pedal member, with said transducer means operably connected to a load and displacement measuring device.

2. A universal, reusable, grip assembly for nondestructive removable attachment to a rudder pedal of an aircraft/aircraft flight simulator, said rudder grip assembly comprising:

a. a first clamp means for being removably attached to an upper portion of said rudder pedal, wherein said means includes:

a first frame member which overhangs said upper portion of said rudder pedal; and a first movable means for securing said first frame member to said rudder pedal, wherein this means includes a first clamp screw member threadedly movable in said first frame member and also in securing contact with a rear surface of said rudder pedal, with said first movable securing means operably associated with said first frame member; and b. a second clamp means for being removably attached to a lower portion of said rudder pedal, wherein this means includes:

a second frame member hingedly connected to said first frame member and disposed in an underslung position relative to said lower portion of said rudder pedal; and a second movable means for securing said second frame member to said rudder pedal, wherein this means includes a second clamp screw member threadedly movable in said second frame member and also in securing contact with a rear surface of said rudder pedal, with said second movable securing means operably associated with said second frame member;

whereby the rudder pedal of said aircraft/aircraft flight simulator to which said rudder pedal grip is removably attached can be used conventionally to operate said aircraft/aircraft flight simulator without the removal of said rudder pedal grip assembly.

3. A rudder pedal grip assembly, as set forth in claim 2, wherein said first frame member has at least one protrusion extending therefrom and in contact with a front surface of said rudder pedal.

4. A rudder pedal grip assembly, as set forth in claim 3, wherein said rudder pedal grip assembly is releasably linked to a remotely located load, whereby said remotely located load can be applied to said pedal.

5. A rudder pedal grip assembly, as set forth in claim 2, wherein said rudder pedal grip assembly is releasably linked to a remotely located load, whereby said remotely located load can be applied to said pedal.

* * * * *